US009228090B2

(12) United States Patent
Musick

(10) Patent No.: US 9,228,090 B2
(45) Date of Patent: Jan. 5, 2016

(54) TREATED INORGANIC PIGMENTS HAVING REDUCED PHOTOACTIVITY AND IMPROVED ANTI-MICROBIAL PROPERTIES AND THEIR USE IN COATING COMPOSITIONS

(75) Inventor: Charles David Musick, Waverly, TN (US)

(73) Assignee: THE CHEMOURS COMPANY TT, LLC, Harrisburg, PA (US)

( * ) Notice: Subject to any disclaimer, the term of this patent is extended or adjusted under 35 U.S.C. 154(b) by 123 days.

(21) Appl. No.: 14/125,696

(22) PCT Filed: Jun. 20, 2012

(86) PCT No.: PCT/US2012/043236
§ 371 (c)(1),
(2), (4) Date: Dec. 12, 2013

(87) PCT Pub. No.: WO2013/003139
PCT Pub. Date: Jan. 3, 2013

(65) Prior Publication Data
US 2014/0135421 A1    May 15, 2014

Related U.S. Application Data

(60) Provisional application No. 61/501,801, filed on Jun. 28, 2011.

(51) Int. Cl.
*C09D 5/14* (2006.01)
*C09C 1/36* (2006.01)
*C09C 3/06* (2006.01)
*C09D 5/16* (2006.01)
*C09D 7/12* (2006.01)
*C08K 9/02* (2006.01)
*C08K 9/06* (2006.01)

(52) U.S. Cl.
CPC ............... *C09D 5/14* (2013.01); *C09C 1/3653* (2013.01); *C09C 1/3661* (2013.01); *C09C 3/06* (2013.01); *C09C 3/063* (2013.01); *C09D 5/1618* (2013.01); *C09D 7/1225* (2013.01); *C01P 2004/62* (2013.01); *C01P 2004/84* (2013.01); *C08K 9/02* (2013.01); *C08K 9/06* (2013.01)

(58) Field of Classification Search
CPC .... C09F 5/14; C01P 2004/62; C01P 2004/84; C09C 1/3653; C09C 1/261; C09C 3/06; C09C 3/063; C09D 5/1618; C09D 7/1225; C08K 9/02; C08K 9/06
See application file for complete search history.

(56) References Cited

U.S. PATENT DOCUMENTS

| 3,528,837 | A | 9/1970 | Sheehan |
| 3,640,743 | A | 2/1972 | Sheehan |
| 5,180,585 | A | 1/1993 | Jacobson et al. |
| 7,029,648 | B2 | 4/2006 | Subramanian et al. |
| 2006/0204456 | A1 | 9/2006 | Asakura |
| 2008/0110497 | A1 | 5/2008 | Inoue et al. |

FOREIGN PATENT DOCUMENTS

| EP | 1674517 | 6/2006 |
| GB | 1 459 025 | 12/1976 |
| GB | 2 242 679 | 10/1991 |
| WO | 95/10940 | 4/1995 |

OTHER PUBLICATIONS

Outlines of Paint Technology, Halstead Press, New York, NY, Third Ediition, 1990. (Book Not Included).
Surface Coatings vol. 1, Raw Materials and Their Usage, Chapman and Hall, New York, NY, Second Edition, 1984. (Book Not Included).
C.R. Martens in Emulsion and Water-Soluble Paints and Coatings, Reinhold Publishing Corp, New York, NY, 1965. (Book Not Included).
Pigment Handbook, T.C. Patten, Ed., Wiley-Interscience, New York, 1973. (Book Not Included).
H.B. Clark, Titanium Dioxide Pigments, Treatise on Coatings, Vol. 3, Pigments, Marcel Dekker, 1975 (Book Not Included).
European International Search Report, International Application No. PCT/US2012/043236, Dated Sep. 19, 2012.

*Primary Examiner* — Kriellion Sanders

(57) ABSTRACT

The disclosure provides a coating composition comprising a treated inorganic particle having reduced photoactivity and improved anti-microbial properties, wherein the treated inorganic particle comprises: an inorganic core particle; a first treatment of a silicon compound, wherein the silicon compound is added in a single step; and a second treatment comprising co-precipitated zinc oxide and alumina.

20 Claims, No Drawings

TREATED INORGANIC PIGMENTS HAVING REDUCED PHOTOACTIVITY AND IMPROVED ANTI-MICROBIAL PROPERTIES AND THEIR USE IN COATING COMPOSITIONS

BACKGROUND OF THE DISCLOSURE

This disclosure relates to an inorganic oxide pigment, and in particular to titanium dioxide pigment, $TiO_2$, suitable for use in coating compositions.

Coating compositions of interest in the present disclosure are water-dispersible coating compositions such as latex coating compositions, e.g. acrylic, styrene acrylic, vinyl acetate, ethylene vinyl acetate, polyurethane, alkyd dispersion etc; and solvent based such as alkyd coating compositions; urethane coating compositions; and unsaturated polyester coating compositions, acrylic, styrene-acrylic compositions typically a paint, clear coating, or stain. These coatings may be applied to a substrate by spraying, applying with a brush or roller OF electrostatically, such as pigment coatings, etc. These coating compositions are described in *Outlines of Paint Technology* (Halstead Press, New York, N.Y., Third edition, 1990) and *Surface Coatings Vol. I, Raw Materials and Their Usage* (Chapman and Hall, New York, N.Y., Second Edition, 1984).

Inorganic pigments may be added to the coating compositions. In particular, titanium dioxide pigments have been added to coating compositions for imparting whiteness and/or opacity to the finished article. To deliver other properties to the coating compositions, additional additives are incorporated into the compositions. What is needed is a titanium dioxide that has multiple properties associated with it.

A need exists for a simplified process for the addition of silica, alumina and zinc oxide to the titanium dioxide pigment that provides opacity, reduced photoactivity and mildewstat properties to the coating.

SUMMARY OF THE DISCLOSURE

In a first aspect, this disclosure provides a coating composition comprising a treated inorganic particle, typically a treated inorganic pigment particle and more typically a titanium dioxide particle, having reduced photoactivity and improved anti-microbial properties, wherein the treated inorganic particle, more typically a titanium dioxide particle, comprises:
 (a) an inorganic core particle, typically titanium dioxide;
 (b) a first treatment of a silicon compound, such as silica, wherein the silicon compound is added in a single step; and
 (c) a second treatment comprising co-precipitated zinc oxide and alumina.

By "co-precipitated" we mean the simultaneous or substantially simultaneous precipitation of zinc oxide and alumina.

DETAILED DESCRIPTION OF THE DISCLOSURE

In this disclosure "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

In this disclosure, when an amount, concentration, or other value or parameter is given as either a range, typical range, or a list of upper typical values and lower typical values, this is to be understood as specifically disclosing all ranges formed from any pair of any upper range limit or typical value and any lower range limit or typical value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

In this disclosure, terms in the singular and the singular forms "a," "an," and "the," for example, include plural referents unless the content dearly dictates otherwise. Thus, for example, reference to "$TiO_2$ particle", "the $TiO_2$ particle", or "a $TiO_2$ particle" also includes a plurality of $TiO_2$ particles.

This disclosure relates to novel pigment compositions comprising inert inorganic particles, typically pigment particles and more typically titanium dioxide particles, having a first treatment of a silicon compound such as silicon dioxide or silica, zinc silicates, or borosilicates, more typically silicon dioxide, and a second treatment of zinc oxide and aluminum oxide that may be used in paints, coatings, caulks, grouts, cements and masonry products and shaped polymeric articles including, but not limited to, films, membranes, fibers, and mono-filaments including but not limited to mono-filaments for brushes. In many applications, the compositions of this disclosure can be used to replace all or part of fillers and/or pigments normally used in the product. For example, if $TiO_2$ is selected as the core material, then the resulting particle, when incorporated into a fiber, will deluster the fiber and may also confer anti-microbial activity. The compositions of this disclosure are particularly useful when incorporated in a polymer carrier matrix composite. The physical properties of such composites are similar to those of the polymers themselves.

The inert inorganic particles may be oxides of titanium, aluminum, zinc, copper, iron; the sulfates of calcium, strontium, barium; zinc sulfide; copper sulfide, zeolites; mica; talc; kaolin, mullite, calcium carbonate, or silica. Lead or mercury compound are contemplated equivalent core materials but may be undesirable due to their toxicity. More typical core materials are titanium dioxide, $TiO_2$ and barium sulfate, and most typically titanium dioxide, $TiO_2$.

In a specific embodiment, the $TiO_2$ can be prepared by any of several well-known methods including high temperature vapor phase oxidation of titanium tetrachloride, vapor phase hydrolysis of titanium tetrachloride, hydrolysis of colloidally seeded sulfuric acid solutions of titaniferous raw materials such as ilmenite, and the like. Such processes are well-known in the prior art.

Because the pigment of this disclosure is to be used in applications requiring high gloss, the size of the initial titanium dioxide core particles should typically be less than one micron, with the average typically falling between 0.15 and 0.25 micron.

Treatments to be applied by the process of this disclosure to the core particles of titanium dioxide can be applied by precipitation in aqueous slurries of the core titanium dioxide particles.

The treatments applied to the core particles in accordance with this disclosure are either porous or dense. The first treatment is with a silicon compound that may be silica or silicon dioxide, zinc silicate, or borosilicate. Silica is typically used because of the ease with which dense, uniform coatings may be obtained. It is applied from a solution of sodium silicate using techniques known to one skilled in the art. To obtain a dense silica treatment, a temperature above 50 C. is typical and more typically above 70 C. The treatment corresponds to about 0.5 to about 20% by weight, more typically about 1 to about 7%, based on the total weight of the titanium dioxide core particle. Silica-coated particles may have a low isoelectric point and may tend to be difficult to disperse in organic materials. The isoelectric point represents the pH at which a particle surface carries zero electric charge. Control of the isoelectric point between 5.5 and 9.5 can be beneficial in facilitating the dispersion and/or flocculation of the particulate compositions during plant processing and in their end use applications.

The amount of silica added in a wet treatment process will often affect the acid solubility of the pigment produced by encapsulating the $TiO_2$ particles. A well encapsulated $TiO_2$ particle will not be dissolved by a strong acid in the acid solubility test. A higher silica level will typically produce a $TiO_2$ product lower in acid solubility. While helpful for reducing acid solubility, the additional silica will typically have negative impacts on gloss, particle size and cost. It is known to add materials to the silica precipitation to improve the uniformity of the coverage of the silica on the $TiO_2$ particle. Borosilicate and zinc silicate are two examples of modifying the silica treatment to improve uniformity of the coverage.

An alternate method of adding a silica coating to the $TiO_2$ particle is a pyrogenic deposition disclosed in U.S. Pat. No. 7,029,648 which is incorporated herein by reference.

The second treatment comprises zinc oxide and aluminum oxide. These treatments are typically porous, applied from a solution of soluble aluminate and a zinc salt using techniques known to one skilled in the art. The pH of the solution during the aluminate treatment will typically range from about 3 to about 10 at a temperature from about 10 C. to about 90 C. The treatment corresponds to about 0.5 to about 20% by weight, more typically about 1 to about 5%, based on the total weight of the titanium dioxide core particle. Less than about 0.5% can cause poor dispersibility of the pigment in paint formulations and an amount of porous treatment greater than about 20% can cause gloss degradation.

The porous treatment consists essentially of alumina and is obtained by precipitating a soluble aluminate in the presence of the core particles. By "soluble aluminate" is meant alkali metal salts of aluminate anions, for example, sodium or potassium aluminate. The soluble aluminates are generally dissolved at a pH of greater than about 10 and are precipitated at a pH of less than about 10 and typically about 7.5 to about 9.5. Because substantially all of the alumina that is precipitated finds its way to a treatment on the core particles, it typically is only necessary to provide that amount of soluble aluminate to the slurry liquid which will result, after precipitation, in the appropriate degree of treatment.

The alumina may also be a dense treatment. The alumina for the dense treatment is obtained from a cationic source of alumina. The term "cationic source of alumina" refers to aluminum compounds that dissolve in water to yield an acidic solution. Examples include aluminum sulfate, aluminum chloride, aluminum fluoride, basic aluminum chloride, and the like.

The second treatment also comprises a co-precipitation of zinc oxide during the alumina treatment step. This treatment is a porous treatment and is applied from a solution of a zinc salt at a temperature of 10 C. to 90 C., and more typically at 25 C. to 80 C. The zinc oxide treatment is typically applied with the alumina treatment from a mixture of zinc chloride or zinc sulfate. The zinc oxide treatment is present in the amount of about 0.3% to about 5% by weight, more typically about 0.5% to about 3%, based on the total weight of the titanium dioxide core particle. An amount of porous treatment greater than about 3% ZnO can cause gloss degradation in a paint formulation; however, the loss of gloss will not hurt a product designed for the flat coatings market (i.e. eggshell paint formulations).

The process for forming a treated inorganic particle, more typically a titanium dioxide particle, having reduced photoactivity, reduced acid solubility and improved anti-microbial properties comprises:

(a) forming an aqueous suspension of inorganic particles, more typically titanium dioxide particles;

(b) depositing a first treatment of silicon compound, such as silica, on the core inorganic oxide particles, more typically titanium dioxide particles, wherein the silicon compound is added in a single step;

(c) depositing a second treatment over the first treatment, said second treatment comprising a zinc salt and an alkaline metal aluminate; and (d) recovering the solids, washing free from water soluble species and drying. This process further comprises micronizing the dried particles.

Typically, the silicon addition in step (b) occurs as a wet precipitation at a pH between 4 and 10, more typically between 7 and 9.5, and at a temperature between 50 C. and 100 C., and more typically between 70 C. and 90 C. Alternately, the silica is deposited pyrogenically in the oxidation process.

Typically, the zinc and aluminate co-precipitation in step (c) occurs at a temperature between 10 C. and 90 C., and more typically between 30 C. and 80 C., and most typically between 50 C. and 75 C.

After the treatments in accordance with this disclosure, the pigment is recovered by known procedures including filtration, washing, drying, sieving, and dry grinding such as micronizing.

Coating Compositions:

This disclosure is particularly suitable for producing coating compositions, and in particular architectural paint formulations or ink formulations.

Coating compositions prepared from colorant and the treated inorganic pigment, particularly treated $TiO_2$ pigment, containing coating bases have improved paint or ink performance.

Coating Base:

The coating base comprises a dispersion of resin and colorants such as the treated inorganic particles of this disclosure. Other additives known to one skilled in the art may also be present.

Resin:

The resin is selected from the group consisting of water-dispersible coating compositions such as latex coating compositions; alkyd coating compositions; urethane coating compositions; and unsaturated polyester coating compositions; and mixtures thereof. By "water-dispersible coatings" as used herein is meant surface coatings intended for the decoration or protection of a substrate, comprising essentially an emulsion, latex, or a suspension of a film-forming material dispersed in an aqueous phase, and typically comprising surfactants, protective colloids and thickeners, pigments and extender pigments, preservatives, fungicides, freeze-thaw stabilizers, antifoam agents, agents to control pH, coalescing aids, and other ingredients. Water-dispersed coatings are exemplified by, but not limited to, pigmented coatings such as latex paints. For latex paints the film forming material is a latex polymer of acrylic, styrene-acrylic, vinyl-acrylic, ethylene-vinyl acetate, vinyl acetate, alkyd, vinyl chloride, styrene-butadiene, vinyl versatate, vinyl acetate-maleate, or a mixture thereof. Such water-dispersed coating compositions are described by C. R. Martens in "Emulsion and Water-Soluble Paints and Coatings" (Reinhold Publishing Corporation, New York, N.Y., 1965). Tex-Cote® and Super-Cote®, Rhopelx®, Vinnapas® EF500 are further examples of water based coating compositions comprising 100% acrylic resin.

The alkyd resins may be complex branched and cross-linked polyesters having unsaturated aliphatic acid residues. Urethane resins typically comprise the reaction product of a polyisocyanate, usually toluene diisocyanate, and a polyhydric alcohol ester of drying oil acids.

The resin is present in the amount of about 5 to about 40% by weight based on the total weight of the coating composition. The amount of resin is varied depending on the amount of sheen finish desired.

Colorant:

The treated inorganic pigments, particularly the treated titanium dioxide pigments described earlier may be used alone or in combination with conventional colorants. Any conventional colorant such as a pigment, dye or a dispersed dye may be used in this disclosure to impart color to the coating composition. In one embodiment, generally, about 0.1% to about 40% by weight of conventional pigments, based on the total weight of the component solids, can be added. More typically, about 0.1% to about 25% by weight of conventional pigments, based on the total weight of component solids, can be added.

The pigment component of this disclosure may be any of the generally well-known pigments or mixtures thereof used in coating formulations, as reported, e.g., in Pigment Handbook, T. C. Patton, Ed., Wiley-Interscience, New York, 1973. Any of the conventional pigments used in coating compositions can be utilized in these compositions such as the following: metallic oxides, such as titanium dioxide, zinc oxide, and iron oxide, metal hydroxide, metal flakes, such as aluminum flake, chromates, such as lead chromate, sulfides, sulfates, carbonates, carbon black, silica, talc, china clay, phthalocyanine blues and greens, organo reds, organo maroons, pearlescent pigments and other organic pigments and dyes. If desired chromate-free pigments, such as barium metaborate, zinc phosphate, aluminum triphosphate and mixtures thereof, can also be used.

Other Additives

A wide variety of additives may be present in the coating compositions of this disclosure as necessary, desirable or conventional. These compositions can further comprise various conventional paint additives, such as dispersing aids, anti-settling aids, wetting aids, thickening agents, extenders, plasticizers, stabilizers, light stabilizers, antifoams, defoamers, catalysts, texture-improving agents and/or antiflocculating agents. Conventional paint additives are well known and are described, for example, in "C-209 Additives for Paints" by George Innes, February 1998, the disclosure of which is incorporated herein by reference. The amounts of such additives are routinely optimized by the ordinary skilled artisan so as to achieve desired properties in the wall paint, such as thickness, texture, handling, and fluidity.

Coating compositions of the present disclosure may comprise various rheology modifiers or rheology additives (such as Acrysol®), wetting agents, dispersants and/or co-dispersants, and microbicides and/or fungicides. To achieve enhanced weatherability, the present coating compositions may further comprise UV (ultra-violet) absorbers such as Tinuvin®.

Coating compositions of the present disclosure may further comprise ceramic or elastomeric substances, which are heat and/or infrared reflective, so as to provide additional heat reflective benefits.

Preparation of the Coating Composition and its Use:

The present disclosure provides a process for preparing a coating composition, such as a paint formulation, comprising mixing the pigment-containing components with the resin to form a coating base. Optionally a vehicle may be present. The vehicle may be aqueous or solvent based. Typically these coating compositions may comprise from about 30 to about 55% solids by weight and typically about 25% to about 45% solids by volume. Typically the coating compositions of this disclosure have a density of about 9.1 to about 11.9 pounds per gallon, more typically about 9.5 to about 10.8 pounds per gallon. Any mixing means known to one skilled in the art may be used to accomplish this mixing. An example of a mixing device includes a high speed Dispermat®, supplied by BYK-Gardner, Columbia, Md.

Coating compositions of the present disclosure may be applied by any means known to one skilled in the art, for example, by brush, roller, commercial grade airless sprayers, or electrostatically in a particle coating. Coating compositions presented herein may be applied as many times necessary so as to achieve sufficient coating on the coated surface, for example, an exterior wall. Typically, these coating compositions may be applied from about 2 mils to about 10 mils wet film thickness, which is equivalent to from about 1 to about 5 dry mils film thickness.

Coating compositions presented herein may be applied directly to surfaces or applied after surfaces are first coated with primers as known to one skilled in the art.

The coating compositions of this disclosure may be a paint, and the paint may be applied to a surface selected from the group consisting of building material, automobile part, sporting good, tenting fabric, tarpaulin, geo membrane, stadium seating, lawn furniture and roofing material.

The treated pigments of this disclosure may be of particular value in cool roofing applications where both higher durability and higher L* from reduced mildew growth are desired.

The examples which follow, description of illustrative and typical embodiments of the present disclosure are not intended to limit the scope of the disclosure. Various modifications, alternative constructions and equivalents may be employed without departing from the true spirit and scope of the appended claims. In one embodiment, the coating films may be substantially free of other conventional colorants and contain solely the treated titanium dioxide pigments of this disclosure.

In the examples which follow, the test results were obtained by the procedures described below.

Chalk Fade Durability

Durability of a pigment is usually measured as resistance to chalking in long-term (for example, 2 years) outdoor exposure tests of paints containing the pigment. Chalk/fade degradation of exterior paints containing $TiO_2$ pigments is partly attributed to catalytic action of the $TiO_2$ surface in oxidation of the organic binder in the presence of ultraviolet radiation, oxygen, and water vapor (H. B. Clark, "Titanium Dioxide Pigments", Treatise on Coatings, Vol. 3, Pigments, Marcel Dekker, 1975). In the following examples, the ultraviolet reactivity of $TiO_2$ pigments was measured by the above method. Typically semi-durable chalk fade durability is greater than about 20, a durable chalk fade durability is greater than about 30, a super-durable pigment has a chalk fade durability of greater than about 35, and a more superdurable pigment has a chalk fade durability of greater than about 45.

Alkyd Gloss

The comparative effect of a $TiO_2$ pigment on gloss of a paint layer was determined by preparing paints with the dry pigment of this disclosure and with pigment standards. Pigment samples were dispersed in an alkyd vehicle and the dispersion was sand-milled and reduced with resins to spray consistency. Aluminum panels were spray painted using automatic spraying equipment under controlled conditions to produce uniform film thickness and surface characteristics. The paint films were then baked. Finally, gloss was determined by measuring 20 degree reflectance of the panels with a Hunterlab D-48-7 glossmeter and calculating gloss in relation to reflectance values of the standards.

Emulsion Gloss

Emulsion (TFW-182) Gloss was determined by preparing an emulsion paint formulation using a slurry sample produced from 76.5% $TiO_2$ solids in water. 100 grams of emulsion gloss masterbatch based on acrylic emulsion resin (Primal AC-388 from Rohm & Haas, a subsidiary of Dow Chemicals, Midland, Mich.) (27% Pigment Volume Concentration) should be used. The paint was produced by mixing 100 grams of masterbatch, 40.3 grams of slurry, and 0.7 grams of water. Draw-downs of the paint were made on black PVC panels, the panels were dried for 3 hours in a constant temperature, constant humidity (CTCH) cabinet, and 60 degree gloss was measured using a Hunter gloss meter (available from Hunter Laboratories, Reston, Va.), and gloss was calculated in relation to reflectance values of standards.

Acid Solubility

Acid solubility is determined as the amount of pigment that dissolves in hot concentrated sulfuric acid.

A small sample of pigment was placed in hot sulfuric acid (about 175° C.) and digested for an hour. The sample was then diluted with a measured amount of water and all particulate material was filtered out. A measured sample of the filtrate was then placed in a volumetric flask. Hydrogen peroxide was added to the flask to ensure all the titanium ions were in the proper oxidation state for their concentration to be determined spectrophotometrically at 400 nm. The flask was then filled to volume with 10% sulfuric acid. The absorbance was measured vs. a blank containing the same amount of hydrogen peroxide as was added to the sample in 10% sulfuric acid. The percent of titanium dioxide was read from a calibration curve prepared from known standards. Typically, a semi-durable pigment particle has an acid solubility of less than about 15, a durable pigment has an acid sol less than about 9, and a super-durable pigment has an acid sol less than about 6.

EXAMPLES

The disclosure will be better understood with reference to the following illustrative examples. Properties of the pigments prepared as in the examples, and those of several commercial pigments, for comparison, are shown in the Tables. AH percentages are on a weight basis.

Comparative Example 1

Five gallons of $TiO_2$ slurry at ~325 grams per liter concentration were added to a small stirred tank. The pH was adjusted to 9.5 using 20% caustic. The slurry was heated to 90 C. Sodium silicate solution was added to the small stirred tank over a period of 30 minutes in an amount sufficient to add 5.6% $SiO_2$. The pH was maintained at 9.5 with dilute hydrochloric acid. The material was stirred for 30 minutes. The slurry was cooled to 75 C with time and ice. The pH was lowered to 8.2 using hydrochloric acid. Sodium aluminate solution was added to the small stirred tank over a period of 60 minutes in an amount sufficient to add 1.2% Al2O3. The pH was held at 8.2 with dilute HCl. The material was stirred for 30 minutes. The material was filtered, dried, screened and micronized. Acid solubility, and 72-hour laminate light stability was measured on the pigment. The pigment was made into paint and emulsion gloss (TFW-182) was tested as described above.

Comparative Example 2

Five gallons of $TiO_2$ slurry at ~325 grams per liter concentration were added to a small stirred tank. The pH was adjusted to 9.5 using 20% caustic. The slurry was heated to 90 C. Sodium silicate solution was added to the small stirred tank over a period of 30 minutes in an amount sufficient to add 5.6% $SiO_2$ while zinc chloride was simultaneously added at an amount sufficient to add 0.3% ZnO to form a zinc silicate glass. The pH was maintained at 9.5 with dilute hydrochloric acid. The material was stirred for 30 minutes. The slurry was cooled to 75 C with time and ice. The pH was lowered to 8.2 using hydrochloric acid. Sodium aluminate solution was added to the small stirred tank over a period of 60 minutes in an amount sufficient to add 1.2% $Al_2O_3$. The pH was held at 8.2 with dilute HCl. The material was stirred for 30 minutes. The material was filtered, dried, screened and micronized. Acid solubility was measured on the pigment. The pigment was made into paint and emulsion gloss (TFW-182) was tested as described above.

Example 1

Five gallons of $TiO_2$ slurry at ~325 grams per liter concentration were added to a small stirred tank. The pH was adjusted to 9.5 using 20% caustic. The slurry was heated to 90 C. Sodium silicate solution was added to the small stirred tank over a period of 30 minutes in an amount sufficient to add 5.6% $SiO_2$. The pH was maintained at 9.5 with dilute hydrochloric acid. The material was stirred for 30 minutes. The slurry was cooled to 75 C with time and ice. The pH was lowered to 8.2 using hydrochloric acid. Sodium aluminate solution was added to the small stirred tank over a period of 60 minutes in an amount sufficient to add 1.2% $Al_2O_3$. Simultaneously, a zinc chloride solution was added at an amount sufficient to add 0.3% ZnO. The pH was held at 8.2 with dilute HCl. The material was stirred for 30 minutes. The material was filtered, dried, screened and micronized. Acid solubility was measured on the pigment. The pigment was made into paint and emulsion gloss (TFW-182) was tested as described above. Results are shown in Table 1.

Example 2

Example 1 was repeated with the following exception: zinc chloride solution was added at an amount sufficient to add 0.5% ZnO. Results are shown in Table 1.

Example 3

Example 1 was repeated with the following exception: zinc chloride solution was added at an amount sufficient to add 1.0% ZnO. Results are shown in Table 1.

Example 4

Example 1 was repeated with the following exception: zinc chloride solution was added at an amount sufficient to add 1.5% ZnO. Results are shown in Table 1.

Results for Comparative Examples 1-2 and Examples 1-4

The paints produced in the six examples above were painted onto boards and given external North facing exposure to enhance mildew growth. Digital images of the boards were taken after 18 months of exposure and analyzed for discoloration using a Hunter Labscan to measure whiteness (L*) as a proxy for discoloration due to mildew growth. The data showed that the L* of the samples produced in the two comparative examples was statistically lower than the L* of the four samples with zinc co-precipitated with the alumina.

Acid solubility, and chalk fade durability were also measured on the pigments produced in the above examples. The results for these are below:

TABLE 1

| Example | Acid Solubility | Chalk Fade | Gloss | 18 month L* |
|---------|-----------------|------------|-------|-------------|
| C1      | 5.4             | 39         | 19.3  | 73.2        |
| C2      | 4.3             | 44         | 18.1  | 71.9        |
| 1       | 4.1             | 40         | 18.9  | 73.7        |
| 2       | 3.6             | 47         | 18.4  | 74.7        |
| 3       | 3.2             | 45         | 20.6  | 72.9        |
| 4       | 3.1             | 45         | 20.1  | 77.4        |

Comparative Example 3

Comparative Example 1 was repeated with the following exceptions: Sodium silicate solution was added in an amount sufficient to add 3% $SiO_2$. Sodium aluminate solution was added in an amount sufficient to add 1.3% $Al_2O_3$. Results are shown in Table 2.

Example 5

Comparative Example 3 was repeated with the following exception: Simultaneously with the addition of the sodium aluminate solution, a zinc chloride solution was added at an amount sufficient to add 1.6% ZnO. Results are shown in Table 2.

Example 6

Example 5 was repeated with the following exception: zinc chloride solution was added at an amount sufficient to add 2.3% ZnO. Results are shown in Table 2.

Example 7

Example 5 was repeated with the following exception: zinc chloride solution was added at an amount sufficient to add 3.6% ZnO. Results are shown in Table 2.

Results for Comparative Example 3 and Examples 5-7

The paints produced in the examples above were painted onto boards and given external North facing exposure to enhance mildew growth. Digital images of the boards were taken after 18 months of exposure and analyzed for discoloration using a Hunter Labscan to measure whiteness (L*) as a proxy for discoloration due to mildew growth. The data showed that the L* of the samples produced in the comparative example was statistically lower than the L* of the three sample with zinc co-precipitated with the alumina.

TABLE 2

| Example | Acid Solubility | Chalk Fade | Gloss | 18 Mo L* |
|---------|-----------------|------------|-------|----------|
| C3      | 5.8             | 24         | 27.0  | 71.9     |
| 5       | 3.2             | 35         | 27.7  | 75.5     |
| 6       | 2.8             | 47         | 25.4  | 76.9     |
| 7       | 2.6             | 43         | 19.8  | 74.2     |

Comparative Example 4

5000 grams of $TiO_2$ containing 2% pyrogenically added $SO_2$ was mixed with 15 liters of water and added to a small stirred tank. The pH was adjusted to 8.2 using 20% caustic. The slurry was heated to 75 C. Sodium aluminate solution was added to the small stirred tank over a period of 60 minutes in an amount sufficient to add 1.3% $Al_2O_3$. The pH was held at 8.2 with dilute HCl. The material was stirred for 30 minutes. The material was filtered, dried, and screened. Acid solubility was measured on the pigment. Results are shown in Table 3.

Example 8

Comparative Example 4 was repeated with the following exception: simultaneously with the sodium aluminate addition, a zinc chloride solution was added at an amount sufficient to add 1.0% ZnO. Results are shown in Table 3

TABLE 3

| Example | Acid Solubility |
|---------|-----------------|
| C4      | 12.7            |
| 8       | 10.3            |

What is claimed is:

1. A coating composition comprising a treated inorganic particle having reduced photoactivity and improved anti-microbial properties, wherein the treated inorganic particle comprises:
    a. an inorganic core particle;
    b. a first treatment of a silicon compound encapsulating the inorganic core particle, wherein the silicon compound has been deposited onto the inorganic core particle in a single step; and
    c. a second treatment over the first treatment, said second treatment comprising zinc oxide and alumina that has been simultaneously precipitated onto the first treatment.

2. The coating composition of claim 1 further comprising a resin.

3. The coating composition of claim 2 wherein the resin is acrylic, styrene-acrylic, vinyl-acrylic, ethylene-vinyl acetate, vinyl acetate, alkyd, vinyl chloride, styrene-butadiene, vinyl versatate, vinyl acetate-maleate, or a mixture thereof.

4. The coating composition of claim 3 wherein the alkyd resin is a complex branched or cross-linked polyester having unsaturated aliphatic acid residues.

5. The coating composition of claim 1 wherein the resin is a urethane resin.

6. The coating composition of claim 2 wherein the resin is present in the amount of about 5 to about 40% by weight, based on the total weight of the coating composition.

7. The coating composition of claim 1 wherein the inorganic core particle is ZnS, $TiO_2$, $CaCO_3$, $BaSO_4$, ZnO, $MoS_2$, silica, talc or clay.

8. The coating composition of claim 7 wherein the inorganic core particle is a titanium dioxide particle.

9. The coating composition of claim 7 wherein the silicon compound is silica.

10. The coating composition of claim 9 wherein the silica is pyrogenically added silica.

11. The coating composition of claim 9 wherein the silica is applied to an inorganic core particle in an aqueous slurry.

12. The coating composition of claim 1 wherein the silicon compound is present in the amount of about 0.5 to about 20% by weight, based on the total weight of the inorganic core particle.

13. The coating composition of claim 1 wherein the alumina is present in the amount of about 0.05% to 20% by weight, calculated as $Al_2O_3$, and based on the total weight of the inorganic core particle.

14. The coating composition of claim 1 wherein the zinc oxide is present in the amount of about 0.3 to about 5% by weight, based on the total weight of the inorganic core particle.

15. The coating composition of claim 8 wherein the titanium dioxide particle has chalk fade of greater than about 20.

16. The coating composition of claim 8 wherein the titanium dioxide particle has an acid solubility of less than about 15.

17. The coating composition of claim 1 wherein the coating composition is a paint.

18. The coating composition of claim 17 wherein the paint is applied to a surface selected from the group consisting of building material, automobile part, sporting good, tenting fabric, tarpaulin, geo membrane, stadium seating, lawn furniture and roofing material.

19. The coating of claim 18 wherein the surface the paint is applied to is a roofing material.

20. A dried coating prepared from a coating composition comprising a treated inorganic pigment, wherein the treated inorganic pigment comprises:
   a. an inorganic core particle;
   b. a first treatment of a silicon compound encapsulating the inorganic core particle, wherein the silicon compound has been deposited onto the inorganic core particle in a single step; and
   c. a second treatment over the first treatment, said second treatment comprising zinc oxide and alumina that has been simultaneously precipitated onto the first treatment.

* * * * *